United States Patent [19]

Moradi-Araghi et al.

[11] Patent Number: 5,100,931
[45] Date of Patent: Mar. 31, 1992

[54] GELATION OF ACRYLAMIDE-CONTAINING POLYMERS WITH HYDROXYPHENYLALKANOLS

[75] Inventors: Ahmad Moradi-Araghi, Bartlesville, Okla.; G. Allan Stahl, Humble, Tex.

[73] Assignee: Phillips Petroleum Company, Bartlesville, Okla.

[21] Appl. No.: 491,993

[22] Filed: Mar. 12, 1990

[51] Int. Cl.$^5$ .................................................. C09K 7/00
[52] U.S. Cl. .................................. 523/130; 524/547; 524/548; 524/555
[58] Field of Search ................ 523/130; 524/547, 548, 524/555

[56] References Cited

U.S. PATENT DOCUMENTS

| | | | |
|---|---|---|---|
| 4,440,228 | 4/1984 | Swanson | 166/274 |
| 4,529,533 | 7/1985 | Chasar | 524/101 |
| 4,822,842 | 4/1989 | Mumallah et al. | 524/346 |
| 4,928,766 | 5/1990 | Hoskin | 166/270 |

FOREIGN PATENT DOCUMENTS 005216 11/1979 European Pat. Off. .

OTHER PUBLICATIONS

"Organic Chemistry", Morrison and Boyd, 3rd Ed. (1976) p. 1043.

*Primary Examiner*—Paul R. Michl
*Assistant Examiner*—John J. Guarriello
*Attorney, Agent, or Firm*—Richmond, Phillips, Hitchcock & Umphlett

[57] ABSTRACT

A novel process is disclosed for crosslinking water-soluble polymers with a hydroxyphenylalkanol crosslinking agent.

6 Claims, No Drawings

GELATION OF ACRYLAMIDE-CONTAINING POLYMERS WITH HYDROXYPHENYLALKANOLS

FIELD OF THE INVENTION

The present invention relates to a novel process for crosslinking water-soluble polymers utilizing a hydroxyphenylalkanol crosslinking agent.

BACKGROUND OF THE INVENTION

It is well known to those skilled in the art that gelled or crosslinked water-soluble polymers are useful in enhanced oil recovery operations. They have been used to alter the permeability of underground formations in order to enhance the effectiveness of water flooding operations. Polymers along with appropriate crosslinking agents are injected in an aqueous solution into the formation. The polymers then permeate into and gel in the regions having the highest water permeability. Any fluids injected into the formation in subsequent water flooding operations will then be diverted away from the regions in which the gel formed to areas of the formation now having a higher water permeability.

Many methods of gelling water-soluble polymers are known in the art such as organic crosslinking with phenolic compounds and water dispersible aldehydes. It is currently desirable to develop other crosslinking systems which may serve as alternatives to these crosslinking systems.

It would therefore be a valuable contribution to the art to provide an alternative crosslinking agent to those presently disclosed in the art.

Thus, it is an object of the present invention to provide a novel alternative crosslinking agent to those presently disclosed in the art.

Other aspects and objects of this invention will become apparent hereinafter as the invention is more fully described in the following summary of the invention and detailed description of the invention, examples, and claims.

SUMMARY OF THE INVENTION

In accordance with the present invention we have discovered that a method of altering the permeability of a porous subterranean formation in fluid communication with a well bore comprising transmitting into said porous subterranean formation (a) a water-soluble polymer in the range of from about 0.1 weight percent to about 5.0 weight percent wherein said water-soluble polymer contains in the range of about 100 mole percent to about 5 mole percent of at least one monomer of the formula

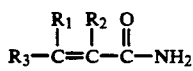

wherein $R_1$, $R_2$, and $R_3$ are selected from the group consisting of hydrogen and alkyl groups containing from 1 to 3 carbon atoms and from 0 to 95 mole percent of at least one monomer selected from the group consisting of:

(i) those monomers which can be represented by the following formula

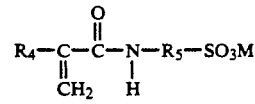

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and an arylene radical containing from 6 to 10 carbon atoms, and M is selected from the group consisting of hydrogen, ammonium, potassium, and sodium;

(ii) a monomer represented by the following formula

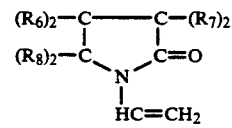

where $R_6$, $R_7$ and $R_8$ are independently selected from the group consisting of hydrogen and alkyl radicals containing from 1 to 2 carbon atoms;

(iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)diethylmethylammonium methyl sulfate; and mixtures thereof;

(b) a hydroxyphenylalkanol in the range of from about 0.05 to about 5 weight percent of the formula

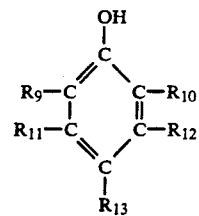

wherein $R_9$, $R_{10}$, $R_{11}$, $R_{12}$ and $R_{13}$, are selected from the group consisting of hydrogen, methyl groups, hydroxyl groups, and alkylol groups, and at least one $R_9$, $R_{10}$, $R_{11}$, $R_{12}$ and $R_{13}$ group must be an alkylol group wherein said alkylol radical contain from 1 to 3 carbon atoms; and (c) water in the range of from about 90 to about 99.9 weight percent; and allowing the water-soluble polymer, hydroxyphenylalkanol and water to gel in said porous subterranean formation.

DETAILED DESCRIPTION OF THE INVENTION

As used in this application, the term water-soluble polymer, copolymers, and terpolymers refers to those polymers which are truly water-soluble and those polymers which are dispersible in water or other aqueous medium to form a stable colloidal suspension which can be pumped into a formation and gelled therein.

The water-soluble polymers which are suitable for use in the present invention include those which contain from 5 to 100 mole percent of at least one monomer of the formula

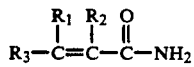

wherein $R_1$, $R_2$, and $R_3$ are selected from the group consisting of hydrogen and alkyl groups containing from 1 to 3 carbon atoms, of which acrylamide and methacrylamide are the preferred examples; and from 0 to 95 mole percent of at least one monomer selected from the group consisting of:

(a) those monomers represented by the formula:

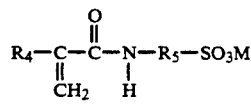

wherein $R_4$ is selected from the group consisting of hydrogen or alkyl radicals containing from 1 to 6 carbon atoms, $R_5$ is selected from the group consisting of alkylene radicals containing from 1 to 6 carbon atoms or an arylene radical containing from 6 to 10 carbon atoms, and M is selected from the group consisting of hydrogen, ammonium, potassium, or sodium, of which 2-acrylamido-2-methylpropane sulfonic acid or sodium 2-acrylamido-2-methylpropane sulfonate are the preferred examples;

(b) monomers represented by the formula

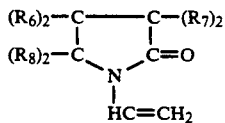

where $R_6$, $R_7$ and $R_8$ are independently selected from the group consisting of hydrogen and alkyl radicals containing from 1 to 2 carbon atoms of which N-vinyl-2-pyrrolidone is the preferred example;

(c) at least one monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, (acryloyloxy-ethyl)diethylmethylammonium methyl sulfate; and mixtures thereof.

The polymerization of any of the above described monomers and the resulting polymers are well known to those skilled in the art. There are numerous references which disclose the methods of polymerizing these monomers, for example see U.S. Pat. No. 4,244,826 or European Patent Application 0115836. The manner in which these monomers are polymerized into water-soluble polymers or the resulting polymers is not critical to the practice to the present invention. The molecular weight of the water-soluble polymers utilized in the present invention is not critical. It is presently preferred, however, that polymers have the molecular weight of at least 100,000 and more preferably about 100,000 to about 20,000,000. The upper limit is not critical as long as the polymer is still water dispersible and can be pumped into the formation.

The presently preferred class of water-soluble polymers are those selected from the group consisting of homopolymers of acrylamide, homopolymers of methacrylamide, copolymers of acrylamide and sodium acrylate, copolymers of acrylamide and sodium 2-acrylamido-2-methylpropane sulfonate, copolymers of acrylamide and 2-acrylamido-2-methylpropane sulfonic acid, copolymers of acrylamide and N-vinyl-2-pyrrolidone, terpolymers of acrylamide, N-vinyl-2-pyrrolidone, and sodium 2-acrylamido-2-methylpropane sulfonate and terpolymers of acrylamide, N-vinyl-2-pyrrolidone, and 2-acrylamido-2-methylpropane sulfonic acid. The ratio of the monomers in the above-described polymers is not critical, provided that at least 5 mole % of acrylamide is present in the above-described polymers. Particularly preferred are terpolymers of N-vinyl-2-pyrrolidone, acrylamide and sodium 2-acrylamido-2-methylpropane sulfonate wherein said monomers are provided in a 30 to 15 to 55 weight percent terpolymer. Additionally within the scope of this invention is the use of combinations of polymers, copolymers and terpolymers utilizing the above listed monomers.

The organic crosslinking system of the present invention is formed from a hydroxyphenylalkanol. Hydroxyphenylalkanols suitable for use in the present invention are of the formula

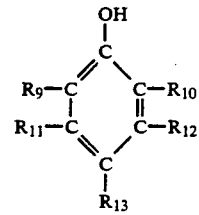

wherein $R_9$, $R_{10}$, $R_{11}$, $R_{12}$ and $R_{13}$ are selected from the group consisting of hydrogen, methyl groups, hydroxyl groups, or alkylol groups and at least one $R_9$, $R_{10}$, $R_{11}$, $R_{12}$, and $R_{13}$ group must be an alkyol group wherein said alkylol radical contains from 1 to 3 carbon atoms. Particularly preferred are 1-(hydroxyphenyl)alkanols which indicates an alkanol wherein the hydroxylphenyl group is bonded to the same carbon atom as the hydoxyl group of the alcohol.

Suitable 1-(hydroxyphenyl)alkanols include but are not limited to 1-(hydroxyphenyl)alkanols selected from the group consisting of 1-(hydroxyphenyl)methanol, 1-(hydroxyphenyl)ethanol, 1-(hydroxyphenyl)propanol, 1-(dihydroxyphenyl)methanol, 1-(dihydroxyphenyl)ethanol, and 1-(dihydroxyphenyl)propanol. Particularly preferred is ortho-hydroxyphenylmethanol (salicyl alcohol).

The constituents of the present invention should be present in about the following ranges:

|  | Broad Range weight percent | Preferred Range weight percent |
|---|---|---|
| water-soluble polymers | 0.1-5 | 0.3-2 |
| hydroxyphenylalkanol | 0.005-5.0 | 0.01-2.0 |
| water | 90-99.9 | 96-99.69 |

The order in which the constituents are mixed is not critical to the practice of the present invention.

The use of gelled polymers to alter the water permeability of underground formations is well known to those skilled in the art. Generally, an aqueous solution containing the polymer and a crosslinking agent is transmitted into the formation from a well in fluid communication with the formation so that the aqueous solution can diffuse into the more water swept portions of the formation and alter the water permeability by gelling therein.

The present invention can be used in a similar manner. An aqueous solution containing the water-soluble polymer and hydroxyphenylalkanol may be transmitted by pumping into the formation, so that it alters the water permeability of the formation in a similar manner when gelation takes place.

The nature of the underground formation treated is not critical to the practice of the present invention. The organic crosslinking agent will gel the water-soluble polymers in fresh water, salt water, or brines, as well as at a temperature range of from 100° F. to 400° F.

The following specific example is intended to illustrate the advantages of this invention, but is not intended to unduly limit this invention.

EXAMPLE I

The purpose of this example is to demonstrate the gelation of a water-soluble polymer by a hydroxyphenylalkanol. Additionally this example demonstrates the long term stability of a gel formed with a water-soluble polymer and a hydroxyphenylalkanol.

A one percent solution of a terpolymer composed of 30 wt % of N-vinyl-2-pyrrolidone, 15 wt % of acrylamide, and 55 wt % of sodium 2-acrylamido-2-methylpropane sulfonate was prepared in the following manner. 100 ml of a 2% polymer solution in synthetic sea water was diluted with 100 ml synthetic sea water.

The synthetic sea water used had the following formula:

| NaHCO$_3$ | 3.69 grams |
|---|---|
| Na$_2$SO$_4$ | 77.19 grams |
| NaCl | 429.00 grams |
| CaCl$_2$.2H$_2$O | 29.58 grams |
| MgCl$_2$.6H$_2$O | 193.92 grams |
| distilled H$_2$O | q.s. to 18 liters |

20 ml of the solution, containing 1 percent of the terpolymer was placed in a 2.3 cm×22.5 cm long ampule. 0.229 ml of a 8.7% salicyl alcohol solution in 50% methanol/50% mixture was also placed in the ampule.

The ampule was sealed under nitrogen then placed upright in a compartmented aluminum box with vent hole, put in an oven and heated to 250° F. Periodically, the ampule was removed from the oven and the mechanical strength of the gel was determined. A glass safety shield was employed while the mechanical strength was determined.

The mechanical strength of the gel was determined by placing the ampule horizontally along a graduated scale and measuring the spread of the gel. If the gel is weak it will spread. The mechanical strength is then expressed mathematically as Percent Gel Strength $= (AL - TL) \times 100/AL$ where AL equals ampule length (22.5 cm), and TL equals the tongue length of the gel measured in centimeters from the point at which the gel contacts the entire circumference of the tube to the farthest point to which the gel has spread. Thus the strongest gels would have a gel strength of 100% and the weakest gels would have a gel strength of 0.

The following results were observed from day 0 to day 374 while aging at 250° F. in Synthetic Seawater.

TABLE I

| Aging Results in Synthetic Seawater at 250° F. | | |
|---|---|---|
| Aging Time (days) | Tongue Length (cm) | Percent Gel Strength |
| 0.25 | 5.0 | 77.8 |
| 0.60 | 7.5 | 66.7 |
| 0.85 | 6.5 | 71.1 |
| 1.6 | 8.3 | 63.1 |
| 2.7 | 6.4 | 71.4 |
| 4.7 | 4.3 | 80.9 |
| 9 | 5.0 | 77.8 |
| 10 | 5.0 | 77.8 |
| 11 | 5.5 | 75.6 |
| 13 | 5.2 | 76.9 |
| 15 | 5.2 | 76.9 |
| 19 | 5.5 | 75.6 |
| 24 | 5.5 | 75.6 |
| 28 | 5.3 | 76.4 |
| 29 | 5.5 | 75.6 |
| 38 | 5.6 | 75.1 |
| 45 | 3.7 | 83.6 |
| 60 | 6.0 | 73.3 |
| 66 | 6.0 | 73.3 |
| 76 | 6.3 | 72.0 |
| 89 | 6.3 | 72.0 |
| 112 | 6.5 | 71.1 |
| 131 | 6.2 | 72.4 |
| 164 | 6.4 | 71.6 |
| 213 | 6.6 | 70.7 |
| 264 | 6.9 | 69.3 |
| 320 | 6.8 | 69.8 |
| 346 | 6.8 | 69.8 |
| 374 | 8.7 | 61.3 |

The results above demonstrate that utilizing a hydroxyphenylalkanol to crosslink a water-soluble polymer provides a good gel with long term stability.

Reasonable variations can be made in view of the following disclosure without departing from the spirit and scope of this invention.

That which is claimed is:

1. A method of altering the permeability of a porous subterranean formation in fluid communication with a well bore comprising transmitting into said porous subterranean formation via the fluid communication of said well bore to said porous subterranean formation
   (a) a water-soluble polymer in the range of from about 0.1 weight percent to about 5.0 weight percent, wherein said water-soluble polymer contains in the range of about 100 mole percent to about 5 mole percent of at least one monomer of the formula

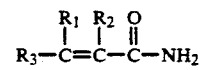

wherein $R_1$, $R_2$ and $R_3$ are selected from the group consisting of hydrogen and alkyl groups containing from 1 to 3 carbon atoms, and from 0 to 95 mole percent of at least one monomer selected from the group consisting of:

(i) those monomers which can be represented by the following formula

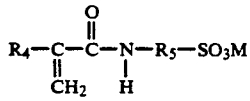

wherein $R_4$ is selected from the group consisting of hydrogen and alkyl radicals containing from 1 to 6 carbon atoms, $R_5$ is selected from the group consisting of alkylene radicals containing from 1 to 6 carbon atoms and an arylene radical containing from 6 to 10 carbon atoms, and M is selected from the group consisting of hydrogen, ammonium, potassium, and sodium;

(ii) a monomer represented by the following formula

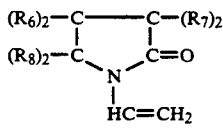

where $R_6$, $R_7$ and $R_8$ are independently selected from the group consisting of hydrogen and alkyl radicals containing from 1 to 2 carbon atoms, (iii) a monomer selected from the group consisting of acrylic acid, sodium acrylate, potassium acrylate, ammonium acrylate, methacrylic acid, sodium methacrylate, potassium methacrylate, ammonium methacrylate, vinylsulfonic acid, sodium vinylsulfonate, potassium vinylsulfonate, ammonium vinylsulfonate, vinylbenzylsulfonic acid, sodium vinylbenzylsulfonate, potassium vinylbenzylsulfonate, ammonium vinylbenzylsulfonate, vinyl acetate, acrylonitrile, methacrylonitrile, vinyl alkyl ether, vinyl chloride, maleic anhydride, vinyl substituted cationic quaternary ammonium compounds, and (acryloyloxyethyl)diethylmethylammonium methyl sulfate; and mixtures thereof;

(b) a hydroxyphenylalkanol in the range of from about 0.005 to about 5.0 weight percent of the formula

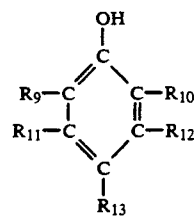

wherein $R_9$, $R_{10}$, $R_{11}$, $R_{12}$ and $R_{13}$, are selected from the group consisting of hydrogen, methyl groups, hydroxyl groups, and alkylol and at least one $R_9$, $R_{10}$, $R_{11}$, $R_{12}$ and $R_{13}$ group must be an alkylol group, wherein said alkylol radical contains from 1 to 3 carbon atoms; and (c) water in the range of from about 90 to about 99.8 weight percent; and allowing the water-soluble polymer, hydroxyphenylalkanol and water to form a gel in said porous subterranean formation.

2. The method of claim 1 wherein said water-soluble polymer is selected from the group consisting of homopolymers of acrylamide, homopolymers of methacrylamide, copolymers of acrylamide and acrylic acid, copolymers of acrylamide and sodium acrylate, copolymers of acrylamide and N-vinyl-2-pyrrolidone, copolymers of acrylamide and sodium 2-acrylamido-2-methylpropane sulfonate, copolymers of acrylamide and 2-acrylamido-2-methylpropane sulfonic acid, terpolymers of N-vinyl-2-pyrrolidone, acrylamide, and sodium 2-acrylamido-2-methylpropane sulfonate and terpolymers of N-vinyl-2-pyrrolidone, acrylamide and 2-acrylamido-2-methylpropane sulfonic acid; and mixtures thereof; and the hydroxyphenylalkanol is a 1-(hydroxyphenyl)alkanol selected from the group consisting of 1-(hydroxyphenyl)methanol, 1-(hydroxyphenyl)ethanol, 1-(hydroxyphenyl)propanol, 1-(dihydroxyphenyl)methanol, 1-(dihydroxyphenyl)ethanol, and 1-(dihydroxyphenyl)propanol.

3. The method of claim 2 wherein said water-soluble polymer is present in the range of from about 0.3 weight percent to about 2 weight percent;

said hydroxyphenylalkanol is present in the range of from about 0.01 to about 2.0 weight percent; and said water is present in the range of from about 96 weight percent to about 99.69 weight percent.

4. The method of claim 1 wherein said water-soluble polymer is a terpolymer of N-vinyl-2-pyrrolidone, acrylamide, and sodium 2-acrylamido-2-methylpropane sulfonate; and said hydroxyphenylalkanol is ortho-hydroxyphenylmethanol.

5. The method of claim 3 wherein said hydroxyphenylalkanol is ortho-hydroxyphenylmethanol.

6. The method of claim 3 wherein said water-soluble polymer is a terpolymer of N-vinyl-2-pyrrolidone, acrylamide, and sodium 2-acrylamido-2-methylpropane sulfonate; and said hydroxyphenylalkanol is ortho-hydroxyphenylmethanol.

* * * * *